Patented Mar. 4, 1952

2,588,210

UNITED STATES PATENT OFFICE 2,588,210

METHOD OF LOCATING LEAKS IN WELL BORES

Orvil W. Crisman, New Orleans, La., and Abraham J. Teplitz, Penn Township, Allegheny County, Pa., assignors, by direct and mesne assignments, to Gulf Research & Development Company, Pittsburgh, Pa., a corporation of Delaware No Drawing. Application November 18, 1949, Serial No. 128,246

4 Claims. (Cl. 250—83.6)

This invention relates to a composition for locating leaks in well bores and processes for using the same.

In the usual practice of drilling wells a boring tool or drill is operated in the presence of a drilling fluid. Some of the functions of the latter are to lubricate and cool the drill, to float the drill cuttings to the surface of the well, and to seal off formations penetrated. The drilling fluids usually are made up of a water suspension of gel-forming materials, including clay or clay-like materials, such as bentonite and the like, and weighting material such as barytes. The term "mud" is commonly applied to such drilling fluids.

These drilling fluids are usually introduced into the well bore in a continuous flow through an opening in the boring tool. The cuttings are suspended in the drilling fluid and as the drilling fluid is circulated the suspended cuttings are carried to the surface. At this point the cuttings are separated from the drilling fluid, whereupon the latter is recycled into the well.

Frequently it happens that the entire amount of drilling fluid is not returned to the surface due to the leakage through cracks, crevices or fissures in the face of the well bore. This leakage is commonly referred to as "lost returns" and when large may entail great expense due to loss of the expensive materials which go to make up the mud. In addition to the cost of the mud itself, leakage through the crevices above-mentioned into the surrounding oil-bearing formations may destroy the productivity of nearby producing horizons or even nearby wells.

One of the purposes of using these drilling muds is to seal off porous formations in the face of the well bore. The mud forms a so-called "mud cake" or "filter cake" on the wall of a porous formation. While a certain amount of water may pass through such a mud cake there is substantially no loss of the mud itself. However, such muds are ineffectual for sealing off large cracks, crevices, fissures or excessively large pores since in this case the entire fluid flows into and is lost in such openings, being carried away from the borehole through the conducting channel by the pressure of the superjacent well fluid. Our invention applies particularly to situations in which such channelled formations are encountered.

Heretofore it has been known to provide drilling muds which contain radioactive materials either in suspension or solution for the purpose of locating porous formations. However, radioactive mud is ineffective for locating channelled formations because like ordinary drilling mud the fluid is taken away far too quickly for a solid mud cake to build up or indeed to remain close enough to the well to be detected. Furthermore, radioactive mud is very expensive since the entire quantity of mud, usually hundreds or thousands of barrels, must be made radioactive. In addition, drilling fluid which is entirely radioactive will mask the location of the leak since cavities in the well bore itself, i. e., wide places in the bore hole, will give the same readings on a radiation detector as those given by porous formations which have been sealed with radioactive mud. An additional difficulty arising from the use of entirely radioactive drilling fluid is that the well is rendered useless for further radioactivity surveys.

It has also been known to employ fibrous materials, such as hemp, bagasse, asbestos, cottonseed hulls, chopped cellophane, etc., as plugging materials. While these materials are more satisfactory than drilling muds for sealing large openings in the face of the well bore they are not traceable, i. e., they cannot be located. Moreover, they do not produce a permanent seal. Consequently, the danger is always present that such temporary seals may be dislodged by the subsequent flow of drilling fluid or by the raising or lowering of the drill and other well tools.

One object of our invention is to provide a composition for plugging large cracks, crevices or fissures in a well bore, which composition may be subsequently located.

Another object is to provide an important saving in the amount of radioactive tracing material used to locate cracks, channels and the like encountered in a well.

Still another object is to provide a method by which a more accurate location of major-sized leaks of drilling fluid may be obtained.

A further and important object is to provide a composition and process which will not render the well useless for later radioactive surveys.

These and other objects are accomplished by our invention, which comprises in a broader sense a composition including a drilling fluid and a traceable sealing material which comprises shreds of a flexible, deformable material insoluble in the drilling fluid and having a structure ranging from fibrous to lamellar, said shreds having incorporated therewith a radioactive material also insoluble in the drilling fluid.

Our invention also contemplates various processes of employing the composition.

Taking up the invention in detail, our composition is prepared by producing radioactivity in shredded fragments of a thin, highly flexible, deformable, infrangible, water-insoluble material. In a preferred embodiment the sealing material may comprise chopped or shredded lamellar material such as cellophane. This material is made radioactive by incorporating particles of carnotite or other radioactive material into the plastic mix prior to the extrusion. After extrusion into sheets, the material may be chopped or shredded into particles of the desired size.

The sealing material may also be fibrous in nature, as for instance asbestos. Fibrous materials may be made radioactive by steeping them in a solution of radium chloride, followed by insolubilization of the radium salt by treatment of the impregnated fibers with sodium sulfate.

With reference to the size of the particles of cellophane (an elastic, transparent, heat resistant, water and oil insoluble, gas tight, cellulose film obtained by extrusion of a viscose solution into a precipitating medium), they may be of any thickness which will conform to the functional requirements of our invention as to flexibility, etc. The most familiar thickness is about .001 inch, which is the form usually employed as wrapping materials. The particles are preferably striplike or extenuated in form and may range in width from about ⅛ inch to 2 inches. The length may vary from about ⅛ inch to 3 inches.

The preferred size and shape of the fibrous materials is about the same as that of the cellophane fragments. The fiber size may range from the normal width and thickness of a single fiber up to a width of about two inches, and a length of about three inches.

If the shredded fragments are too large, they tend to agglomerate and cause clogging along the path of flow of the drilling fluid. If they are too small, they do not adequately perform the plugging function. Ideally, the particles are of graded size, that is, the particles are of all sizes from the smallest to the largest of the dimensions set forth above.

Having obtained the radioactive sealing material in the proper size, the particles are incorporated into the drilling fluid. The proportions preferred are from about 1 to 100 parts by weight of sealing material to about 4000 parts by weight of drilling fluid.

The composition of drilling fluid and radioactive sealing materials thus obtained is introduced into the well bore in any conventional manner. In the case of a large crevice in the face of the well bore, the flow of drilling fluid through this opening will be relatively rapid. Consequently, the fragments of sealing material tend to be swept along this path rather than to the surface of the well. In any event, whether the flow is slow or fast through the leak, some sealing material will always be present in the leaking drilling fluid. During the passage of the drilling fluid through the leak, the fragments of sealing material tend to catch along the edges of the opening and build up continually. If the particles are of graded size the large fragments build up first, with the smaller fragments then filling in the openings between. In this manner a temporary seal is formed.

The seal may be subsequently located after flushing with clean mud, removing the drill and drill stem. A Geiger counter or ionization-type radioactivity detection device well known per se is then lowered into the well. The readings obtained from this instrument will indicate the region of greatest radioactivity, from which the location of the leak may be inferred. Such leaks or crevices in the face of the well bore may then be permanently sealed by spotting a quick setting cement at the location of the leak. After the cement is set normal drilling operation may be resumed with the leak effectively and permanently thus sealed off.

The unused radioactive sealing material may be subsequently recovered at the surface from the drilling fluid, if desired, by any conventional means known to the art, such as coarse filtration.

While we have set forth certain specific sealing materials in the description above, others may be used, such as feathers, asbestos, bagasse, wood pulp, jute, hemp, sugar cane fibers, etc. Furthermore, other lamellar materials may be used instead of cellophane, such as thin shreds of cellulose nitrate, cellulose acetate, or other synthetically produced plastics. These may be used in conjunction with any water-insoluble radioactive material which is to be incorporated therewith.

We have also set forth certain specific particle sizes and certain composition ratios in the above description. These are merely preferred and not intended to be limiting since it is obvious that other particle sizes may be used with at least some degree of success. Also the composition ratios employed above were chosen chiefly for reasons of economy. Less or more of the sealing material would also be operative in some degree.

While our invention has been discussed principally with reference to its use with drilling fluids, either aqueous or oil-base type, we do not intend to be limited thereto. We contemplate using our composition with any fluid employed in a well, where loss of the liquid through leakage is undesirable. An example of such a fluid would be the acid used in chemical treatment of the well.

One advantage of our invention is that it provides a composition which may be used to seal and locate relatively large cracks, crevices, fissures, etc. in the face of the drill hole.

Another advantage of our process and composition is that they effect an important saving in the amount of radioactive tracing material.

A further advantage of our composition is that it provides a definite and reliable indication of the location of the leak. The location of such leaks is not masked by a large amount of radioactive material at other places in the well bore.

A still further advantage of our process is that by making only a portion of the fluid radioactive rather than the entire amount, the well is not rendered useless for subsequent radioactivity surveys.

An additional and important advantage of our process is that the leak may be quickly located and sealed with a permanent sealing material. A particular advantage of locating the leak is that it enables the placement of the permanent seal at the proper point. In prior practice the seal is either placed haphazardly so as to cover the entire exposed section of the well bore or it is placed by trial and error, both of these being expensive procedures. By the use of our invention the position of the leak can be definitely determined and the permanent seal spotted at this point.

Our invention further allows the operator to locate a leak without removing the drill pipe from the well by running the radioactivity detector down the inside of the drill pipe. This is advantageous in wells which have penetrated high-pressure formations and from which it is oftentimes dangerous to withdraw the drill pipe because of the danger of a blowout. In such wells the use of our invention permits the remedial process to be carried out without the necessity of removing the drill pipe.

While in describing our invention reference has been made to aqueous drilling mud, our invention may likewise be used with oil-base mud, well-drilling emulsions or other drilling fluids whether they be weighted or not.

What we claim as our invention is:

1. The method of locating leaks in a well bore which comprises introducing into the well bore a composition comprising a drilling fluid and a traceable sealing material which comprises fragments of a flexible, deformable material insoluble in the drilling fluid and having a structure ranging from fibrous to lamellar, said fragments having incorporated therewith a radioactive material insoluble in the drilling fluid, and then locating the depth of the radioactive sealing material by surveying the well for radioactivity.

2. The method of locating leaks in a well bore which comprises introducing into the well bore a composition comprising a drilling fluid and a traceable sealing material which comprises shreds of a flexible, deformable, water-insoluble material having a structure ranging from fibrous to lamellar, said shreds having incorporated therewith a water-insoluble radioactive material, and then locating the depth of the radioactive sealing material by surveying the well for radioactivity.

3. The method of locating leaks in a well bore which comprises introducing into the well bore a composition comprising a drilling fluid and a traceable sealing material which comprises shreds of flexible, deformable, water-insoluble cellophane, said cellophane shreds having incorporated therewith a water-insoluble radioactive material, and then locating the depth of the radioactive sealing material by surveying the well for radioactivity.

4. The method of sealing leaks encountered in drilling a well bore which comprises introducing into the well bore through the drill stem a composition comprising a drilling fluid and a traceable sealing material which comprises fragments of a flexible, deformable material insoluble in the drilling fluid and having a structure ranging from fibrous to lamellar, said fragments having incorporated therewith a radioactive material insoluble in the drilling fluid, then locating the depth of the radioactive sealing material by making a radioactivity survey inside the drill stem, and finally applying a permanent sealing material through the drill stem to the location in the annular space surrounding the drill stem corresponding to the depth of observed concentration of radioactive sealing material.

ORVIL W. CRISMAN.
ABRAHAM J. TEPLITZ.

REFERENCES CITED

The following references are of record in the file of this patent:

UNITED STATES PATENTS

| Number | Name | Date |
| --- | --- | --- |
| 2,220,205 | Buckley | Nov. 5, 1940 |
| 2,231,577 | Hare | Feb. 11, 1941 |
| 2,339,129 | Albertson | Jan. 11, 1944 |
| 2,346,043 | Mysels | Apr. 4, 1944 |
| 2,353,372 | Stone | July 11, 1944 |
| 2,358,945 | Teichmann | Sept. 26, 1944 |
| 2,451,472 | Coggeshall | Oct. 19, 1948 |